Nov. 20, 1962     D. A. THOMSON     3,064,637
PORTABLE BARBECUE
Filed May 17, 1961
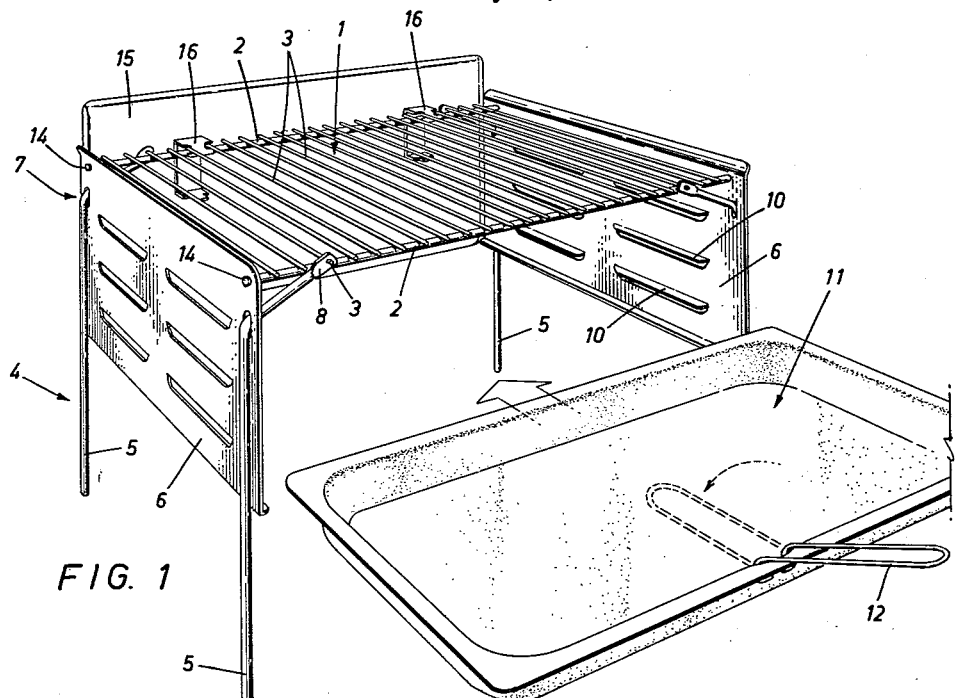
FIG. 1
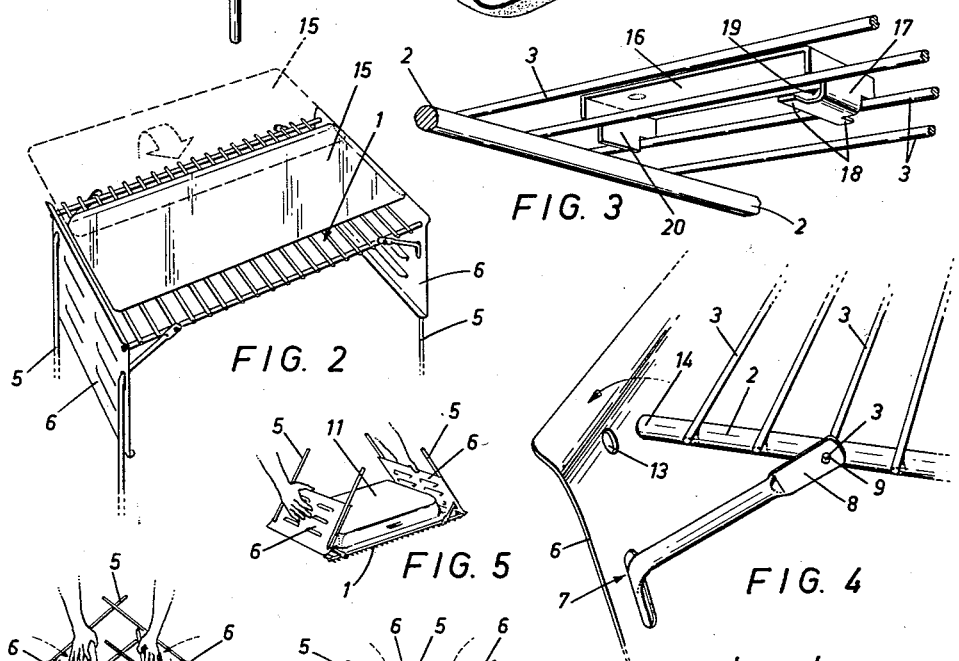
FIG. 2
FIG. 3
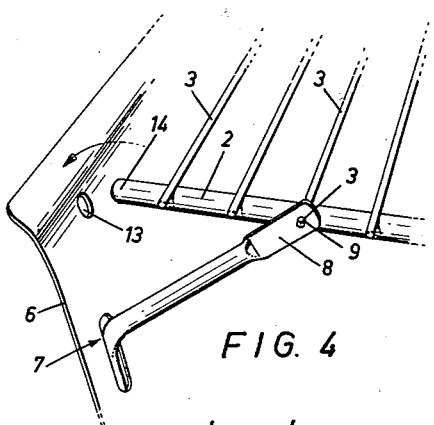
FIG. 5
FIG. 4
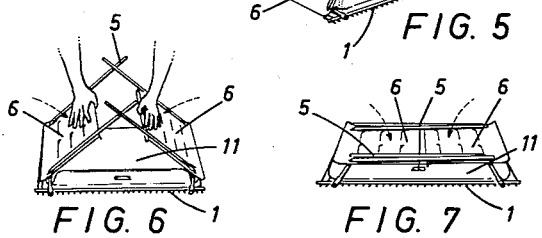
FIG. 6     FIG. 7
Inventor
DONALD A. THOMSON
by: *Douglas S. Johnson*
Attorney

United States Patent Office 3,064,637
Patented Nov. 20, 1962

3,064,637
PORTABLE BARBECUE
Donald A. Thomson, Toronto, Ontario, Canada, assignor to General Steel Wares Limited, Toronto, Ontario, Canada
Filed May 17, 1961, Ser. No. 110,756
7 Claims. (Cl. 126—9)

This invention relates to portable barbecues and the principal object of the invention is to provide a very inexpensive, lightweight barbecue which can be quickly and easily folded into an extremely compact unit for carrying and storing and can be as quickly and easily unfolded and set up for use.

Another important object is to provide a portable barbecue as aforesaid which will afford a large broiling area and a wide range of adjustment between the fire pan and the broiling surface.

Still another important object is to provide such a portable barbecue which will incorporate a unique windguard which can be used as well to form a warming shelf and a frying or bun-warming griddle.

According to one feature of the invention, the barbecue comprises a wire grid or grill to which is pivotally connected end leg members carrying resilient end plates adapted to releasably interlock with the grill to releasably secure the legs in an erected position perpendicular to the plane of the grill and to allow release of the legs to swing to a collapsed or folded position substantially parallel to the plane of the grill, the end plates affording windbreaks and as well support means for the fire pan to support the fire pan at selective spacing from the grill with the barbecue erected.

Another important feature resides in supporting from the grill a plate which is movable with the barbecue erected from a vertical windguard position extending between the side plates at the rear of the barbecue to a horizontal warming shelf position partially overlying the grill or to a horizontal griddle position at least substantially completely overlying the grill. In this connection, according to the preferred form of the invention the wire grid or grill comprises a pair of spaced longitudinal wires supporting a series of transverse wires and the windguard and griddle plate is supported from the grill by means of, preferably, a pair of bracket members provided with notched legs introduced between and interlocked beneath adjacent pairs of transverse grid wires, the notched legs further being adapted on contact with the rear longitudinal wire to form a pivot allowing the plate to swing or fulcrum about the longitudinal wire between horizontal and vertical positions while still providing an interlock with the transverse wires.

Still a further feature resides in utilizing selected transverse wires at each end of the grill as the pivot support for the legs at the respective end.

Again it is a feature to utilize the longitudinal wires as the means of interlocking the end plates and the grid, the latter wires being arranged to snap into and out of openings provided in the end plates as permitted by the resiliency of the end plates.

Still a further feature resides in striking out from the end plates a series of ledges at different heights to form a series of selective supports for the fire pan.

These and other objects and features will become apparent from the following detailed description taken in conjunction with the accompanying drawings in which:

FIGURE 1 is a perspective view illustrating a portable barbecue constructed in accordance with the invention and showing the fire pan ready to be inserted beneath the grill and showing the griddle plate in the depending windbreak position;

FIGURE 2 is a perspective view of the portable barbecue of FIGURE 1 on a reduced scale showing the griddle plate in the griddle position overlying the grill in solid lines and in shelf warming position in dotted lines;

FIGURE 3 is a broken away perspective view taken from the underside of the grill showing the interlock between the grill wires or bars and the griddle plate;

FIGURE 4 is an enlarged fragmentary perspective view illustrating the interlock provisions between the leg units and the grill;

FIGURES 5, 6 and 7 are perspective views on a reduced scale showing the collapsing action of the barbecue.

With reference particularly to FIGURE 1, it will be seen that the barbecue comprises a grill generally designated at 1 formed of a pair of longitudinal wires or bars 2 supporting a series of spaced transverse wires or bars 3. Secured to the grill 1 are leg units generally designated at 4 each comprising a pair of spaced legs or posts 5 having secured therebetween a panel 6 of sheet metal or the like having a measure of resiliency. The legs 5 of each leg unit 4 have their upper ends turned angularly inwardly as at 7, and these upper ends terminate in flattened portions 8 having holes 9 therein adapted to receive the ends of a selected transverse wire or bar 3 of the grill 1 with the transverse wires projecting laterally beyond the longitudinal wires 2. The panels 6 have a series of ledge formations 10 struck out therefrom, which ledges are adapted to support a fire pan 11 at selective spacings beneath the grill 1. The fire pan is shown as provided with a pivotal handle 12 which can be swung from the extended position shown in solid line in FIGURE 1 to the retracted position shown in dotted line in FIGURE 1 for storing of the unit.

Each of the panels 6 of each of the leg units 4 is provided with a pair of spaced holes or openings 13 which are adapted to receive and interlock with the ends 14 of the longitudinal bars 2. The resiliency or yieldability of the panels 6 will allow the panel to flex outwardly at the top so that when the leg units 4 are swung to the erect or grill supporting position, they will allow entry of the ends 14 of the longitudinal wires and on release the wire ends will be projected through the holes 13 and the grill will be supported in a horizontal position with the leg units 2 substantially perpendicular thereto.

In order to collapse the barbecue, the panels 6 can be flexed outwardly to clear the panels from the ends 14 of the wires 2 whereupon the leg units can swing about the pivots as formed by the connection between the selected transverse wire 3 and the flattened portions 8 of the legs 5, that is, about the pivots 9, until the leg units are substantially parallel to the grill 1 as shown in FIGURE 7.

As shown particularly in FIGURES 1, 2 and 3, there is provided a griddle plate 15 which has secured thereto on the underside thereof a pair of guide brackets 16, each of which has at one end a depending leg 17 projecting between a pair of spaced transverse bars or wires 3 and provided with right angularly turned wings 18 adapted to project laterally beneath the wires 3, the leg 17 in effect being notched as at 19 to accommodate the wires 3.

At the opposite end, each of the brackets 16 is provided with a depending tongue 20 adapted to project downwardly between the same pair of spaced transverse wires as the notched leg 17. With this arrangement, as shown in FIGURES 2 and 1, the griddle plate 15 is adapted to be moved from a griddling position overlying and parallel to the grill 1 to a shelf warming position shown in dotted line in FIGURE 2. In this shelf warming position the tongue 20 of the guide bracket 16 can move until it contacts the inside surface of the rear longitudinal wire 2 with such contact forming a stop or limit position. The interlock of the wings 18 beneath the respective pair of transverse wires will prevent tilting of the griddle plate in its shelf warming position upon food or other items being placed thereon.

It will be noted that the tongue 20 does not provide for an interlock beneath the transverse wires 3 so that upon lifting the griddle plate to clear the tongue 20 from contact with the rear longitudinal grill wire 2, the griddle plate can be moved rearwardly until the wings 18 contact the inside surface of the rear longitudinal wire 2 at which time the griddle plate can fulcrum about the notched leg 17 on the rear wire 2 to swing to a depending position as shown in FIGURE 1 where the plate now serves as a windbreak extending between the leg units 4.

As shown in FIGURES 5, 6 and 7, when it is desired to collapse the barbecue, the fire pan 11 can be placed in its position immediately beneath the grill 1 and with the griddle plate 15 in its solid line position of FIGURE 2 and the whole unit turned upside down, the leg panels 6 can be flexed outwardly to release the releasable interlock between such panels and the wire ends 14 and the leg units swung inwardly until they lie parallel to the grill 1 with the fire pan 11 located between the leg units and the grill. It will be understood, of course, that the handle 12 of the fire pan will be swung to the dotted line retracted position shown in FIGURE 1 in this collapsing action. Further, it will be noted that the leg members 5 of the leg units 4 will interengage to assist in holding the barbecue in the collapsed position.

With this arrangement, it will be observed that the barbecue can be very quickly and easily erected or collapsed and this action is provided in an extremely simple construction. Further, it will be observed that provision is made for selective spacing between the fire and the food on the grill through the provision of the panel ledges 10. In addition the flexibility of location of the griddle plate 15 provides for a high functional utility of the barbecue without complicating its structure.

While the preferred form of the invention has been described and illustrated, it will be understood that variations in specific details and the arrangement of the parts may be made within the spirit of the invention and without departing from the scope of the appended claims.

What I claim is:

1. A portable barbecue comprising a grill, said grill including a pair of longitudinal wires supporting therebetween a series of transverse wires, a leg unit pivotally connected to certain of said transverse wires, one adjacent each end of said grill to swing between a collapsed position substantially parallel to said grill and a grill supporting position substantially perpendicular to said grill, each of said leg units comprising a pair of spaced post members supporting a yieldable panel therebetween, the upper ends of said post members projecting laterally out of the plane of said panel and having openings therein to pivotally receive the ends of a selected transverse wire of said grill inwardly of the ends of said longitudinal grill wires, and means affording a releasable interlock between said leg unit and grill comprising openings in said yieldable panel adapted to register with and receive the respective ends of said longitudinal grill wires with said leg unit swung to its grill supporting position, said longitudinal wire ends being releasable from said panel openings upon displacement of said yieldable panel to clear said wire ends.

2. A portable barbecue as claimed in claim 1 in which a means to support a fire pan comprises a series of ledges formed on said leg unit panels to support said pan at selective spacings beneath said grill.

3. A portable barbecue as claimed in claim 1 in which there is provided a griddle plate having means slidably and interlockably interengaged with said transverse grill wires, said griddle plate being shiftable from a position at least partially overlying and parallel to said grill to a position depending substantially vertically downwardly from said grill to form a windbreak between said leg units with said leg units in grill supporting position.

4. A portable barbecue as claimed in claim 1 in which said means connecting said griddle plate and said grill comprises a pair of spaced guide brackets secured to the underside of said griddle plate and each having a leg portion projecting between a pair of spaced transverse wires and having wing means interlockingly engaged beneath the said pair of spaced wires.

5. A portable barbecue as claimed in claim 4 in which said guide brackets are spaced apart a predetermined distance from an edge of said griddle plate whereby said plate will extend upwardly for a predetermined distance above said grill in said depending position.

6. A portable barbecue as claimed in claim 4 in which said means connecting said griddle plate and said grill comprises a pair of spaced guide brackets secured to the underside of said griddle plate, each of said brackets comprising a main body portion having a leg of reduced width projecting between a pair of spaced transverse wires, said leg portion being bent back under said body portion and having a laterally extending wing thereon whereby said griddle plate may be moved from said position parallel to said grill to said depending position.

7. A portable barbecue as claimed in claim 6 in which said guide brackets each have a further guide leg portion adapted to project downwardly between the respective pair of transverse wires with said griddle plate in said position parallel and at least partially overlying said grill.

References Cited in the file of this patent
UNITED STATES PATENTS

| | | |
|---|---|---|
| 2,515,521 | Loffredo | July 18, 1950 |
| 2,780,215 | Vacanti | Feb. 5, 1957 |
| 2,787,996 | Rumsey | Apr. 9, 1957 |